United States Patent
Berger et al.

(10) Patent No.: US 6,266,322 B1
(45) Date of Patent: Jul. 24, 2001

(54) DIMENSIONING BANDWIDTH AND CONNECTION ADMISSION CONTROL FOR ELASTIC TRAFFIC IN HIGH-SPEED COMMUNICATION NETWORKS

(75) Inventors: Arthur W. Berger; Yaakov Kogan, both of Fair Haven, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/092,422

(22) Filed: Jun. 5, 1998

Related U.S. Application Data

(60) Provisional application No. 60/074,551, filed on Feb. 12, 1998.

(51) Int. Cl.[7] .................................................. G01R 31/08
(52) U.S. Cl. ......................... 370/229; 370/252; 379/111
(58) Field of Search ........................... 370/229, 230–234, 370/395, 235–238, 255, 407, 396, 252; 379/111–114, 220, 229

(56) References Cited

U.S. PATENT DOCUMENTS

| | | | | |
|---|---|---|---|---|
| 5,764,740 | * | 6/1998 | Holender | 379/112 |
| 5,917,804 | * | 6/1998 | Shah et al. | 370/229 |
| 5,991,272 | * | 11/1999 | Key et al. | 370/252 |

* cited by examiner

*Primary Examiner*—Wellington Chin
*Assistant Examiner*—Premell Jones

(57) ABSTRACT

A method for dimensioning link bandwidth for elastic-data traffic for a link in a communications network, in which a number of connections N having elastic-data traffic flowing over a bottlenecked link in a communications network is determined. A transfer rate ?f for each connection is determined for the condition that the communications network is not a constraining resource for the connection. A per-connection bandwidth objective b is determined for elastic-data traffic flowing over the link. Lastly, a link bandwidth B for the link is dimensioned for the elastic-data traffic flowing over the link based on either a mean performance criterion or a tail performance criterion using the determined number of connections N, the determined transfer rate for each connection and the determined per-connection bandwidth objective b.

22 Claims, 4 Drawing Sheets

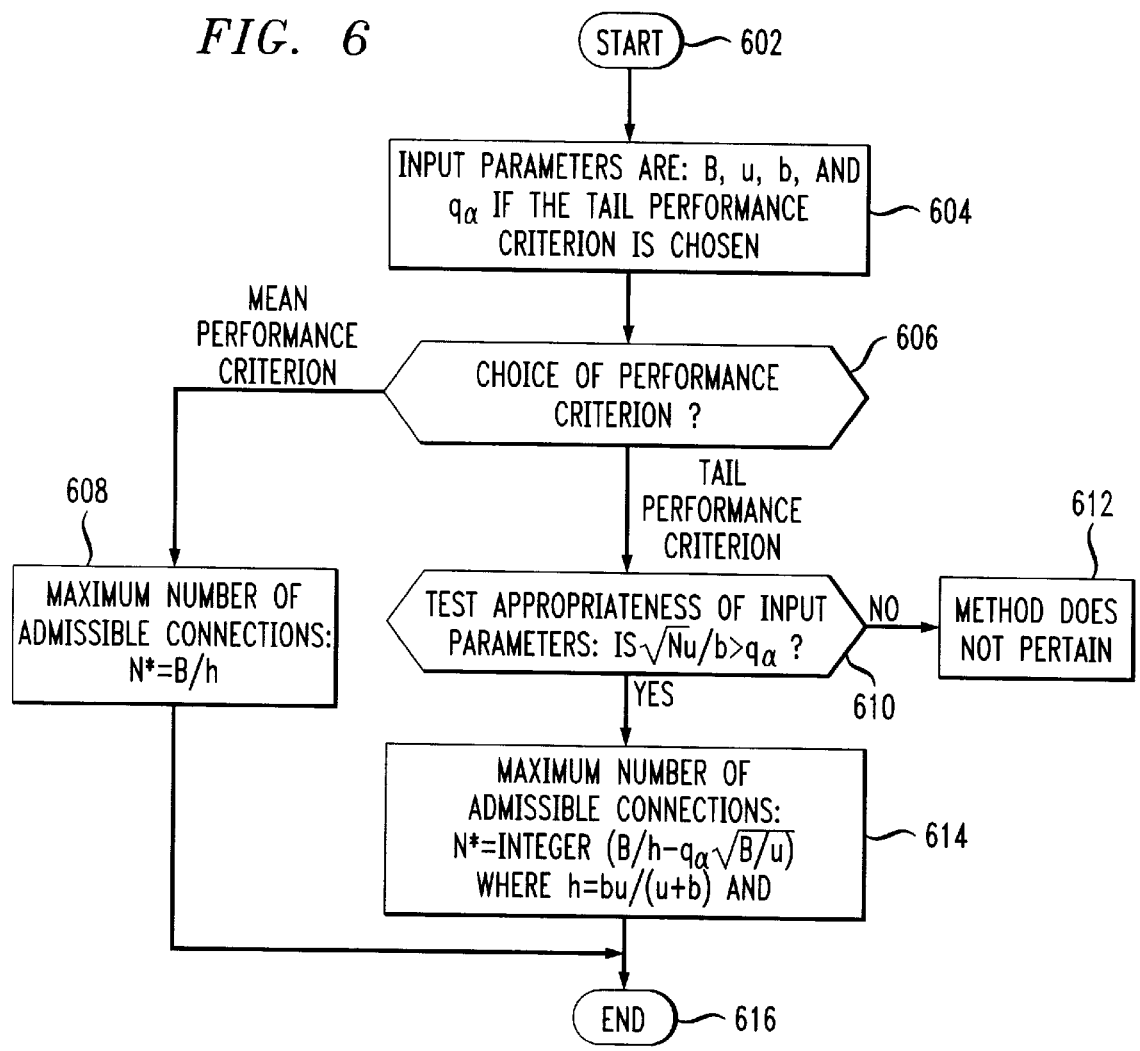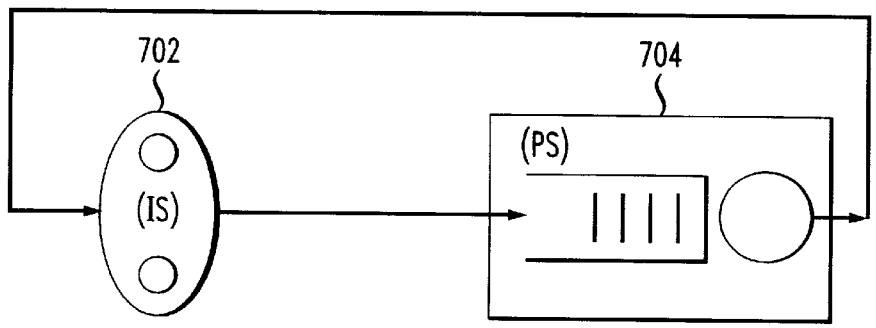

US 6,266,322 B1

DIMENSIONING BANDWIDTH AND CONNECTION ADMISSION CONTROL FOR ELASTIC TRAFFIC IN HIGH-SPEED COMMUNICATION NETWORKS

RELATED APPLICATION

This application claims the benefit of priority afforded by provisional application No. 60/074,551, filed Feb. 12, 1998.

BACKGROUND OF THE INVENTION

1. Field of the Invention

The present invention relates to a method for dimensioning link bandwidth for elastic-data traffic. More particularly, the invention relates to the dimensioning of bandwidth for elastic-data traffic in a high-speed communications network in which the number of connections to be supported on a particular link is determined. Moreover, given that the bandwidth of the link is determined, the invention relates to a method for determining the maximum number of connections that can be supported on the link.

2. Description of the Related Art

The use of data networks for the reliable high speed transport of information, such as text, voice, video, etc., over wide areas in digital format via a variety of media including optical fibers is bringing major changes to network services and network architecture/infrastructure design. Many new services having diverse characteristics and bandwidth requirements are now feasible.

FIG. 1 illustrates a small portion of a typical high speed network 10, comprising switching nodes 11 which are connected by bandwidth data links 12. Inputs to the network 10 are received by a plurality of user end-systems 13 which are connected to network 10 by corresponding links 14. The inputs may be of any form, but are conveniently formatted at the user end-systems 13 into packets for transmission to other user end-systems 13. Data is transmitted between user end-systems 13 as elastic-data traffic. A link 12, 14 may be the entire bandwidth available to a transmission path between network nodes or between a user end-system 13 and a network node 11, or may be a portion of the bandwidth of the transmission path. Inherent in the transfer of elastic-data from one user end-system 13 to another is that the rate of transfer is directly dependent on the constraints imposed by the network 10 as well as the constraints imposed by equipment employed at the user end-system 13. For example, some factors which may constrain the transport of data include the protocols used to transmit the data, the amount of congestion in a given link 12, 14, the bandwidth of the link 12, 14 and how many connections are simultaneously being transported over the link 12, 14.

In designing a high speed network, an important step is the dimensioning or capacity assignment of each link within the network. The dimensioning step typically occurs once the location of the nodes (e.g., the city in which a particular node will reside) and the connectivity between nodes (e.g., which nodes will be interconnected) is determined.

Elastic-data traffic adapts to time-varying available bandwidth over a communications link using a feedback control scheme. Examples of such schemes are the Transmission Control Protocol (TCP) over the Internet or an Available Bit Rate (ABR) transfer capability in Asynchronous Transfer Mode (ATM) networks. Typical elastic-data applications are the transfer of files supporting e-mail or the transfer of files over the world wide web. A file is a digital object that encodes information which, for example, may be a document, a computer program, data-base records, or an audio or video recording. A file resides in some memory or storage device associated with the user's end-system. The problem of dimensioning bandwidth for elastic-data applications can be viewed as a variation of the well-known "capacity assignment problem" described in the literature on design of computer networks. For example, see D. Bertsekas et al., Data Networks 2nd Edition, Prentice Hall, Englewood Cliffs, N.J., 1992.

Prior art approaches to the capacity assignment problem calculate load based on a flow of packets whose characteristics are assumed to be exogenous (independent) of the state of the network including the presence of other flows. The problem also considers a performance criterion in the form of delay of packets. The outcome of the capacity assignment problem is flawed in that the calculations do not take into consideration the dependent character of the packet flows of elastic data traffic, or that the performance criterion of most interest to the user is the transfer delay of the entire file.

Dimensioning bandwidth for elastic-data traffic can also be compared to conventional traffic dimensioning for telephone networks. Conventional dimensioning of telephone circuits uses the well-known Erlang blocking formula, while a generalized Erlang blocking model is used for multi-rate circuits. Recursive solutions associated with conventional dimensioning of telephone circuits are disclosed by J. S. Kaufman, Blocking in a shared resource environment, IEEE Transactions on Communications, Vol. 29, 1981, pp. 1474–1481; and by J. W. Roberts, G. Pujolle (ed.), A service system with heterogenous user requirements, Performance of data communications systems and their applications, North Holland, 1981, pp. 432–431. Asymptotic approximations for conventionally dimensioning telephone circuits are disclosed by Y. Kogan and Michael Shenfild, "Asymptotic solutions of generalized multiclass Engset model," in The Fundamental Role Teletraffic in the Evolution of Telecommunications Networks, Proc. of 14$^{th}$ Inter. Teletraffic Congress, J. Labetoule, J. W. Roberts Eds., Elsevier, 1994, pp. 1239–1249, and by D. Mitra et al., Erlang capacity and uniform approximations for shared unbuffered resources, IEEE/ACM Transactions on Networking, Vol. 2, 1994, pp. 581–587. Both recursive and asymptotic approaches for dimensioning telephone networks assume constant-rate connections, which is natural for traditional circuits.

Recently, the concept of effective bandwidth has extended the applicability of the conventional techniques used for dimensioning telephone circuits to variable-rate connections by using the concept of a constant "effective" rate. For recent summaries of conventional techniques using constant effective rate concepts, see, for example, C.-S. Chang et al., Effective bandwidth in high-speed digital networks, IEEE Journal on Selected Areas of Communications, Vol. 13, August 1995, pp. 1091–1100; G. de Veciana et al., Resource management in wide-area ATM networks using effective bandwidths, IEEE Journal on Selected Areas of Communications, Vol. 13, August 1995, pp. 1081–1090; and, F. P. Kelly, Notes on effective bandwidths, Stochastic Networks, Claredon Press, Oxford, 1996, pp. 141–168.

The concept of assigning an effective bandwidth is reasonable for specific parameter regions of classes of traffic, such as packet voice, packet video, frame relay, and Statistical Bit Rate (SBR) service in ATM networks. Nevertheless, elastic-data traffic does not have an inherent transmission rate because the traffic adapts to available bandwidth. Consequently, the concept of an effective bandwidth for elastic-data traffic seems dubious. Further, the conventional performance criterion of a blocking probability of a new connection request is irrelevant for best-effort type services if, generally speaking, all connection requests are granted, or if a request is not even made prior to the transmission of the user data.

SUMMARY OF THE INVENTION

The present invention provides a technique for dimensioning link bandwidth for elastic-data traffic in a communications network, such as an ATM network or a network that uses the Transmission Control Protocol for sending the elastic-data traffic through the network. The advantages of the present invention are provided by a method for dimensioning link bandwidth for elastic-data traffic for a link in a communications network, in which a number of connections N having elastic-data traffic flowing over a link in a communications network is determined. The term "connection", as used herein, applies to either an ATM connection, or more generally a virtual circuit in a connection-orientated packet network or, with some blurring of meaning, to an IP flow of packets. A transfer rate u for each connection is determined for the condition that the communications network is not a constraining resource for the connection. A perconnection bandwidth objective b is determined for elastic-data traffic flowing over the link. Lastly, a link bandwidth B for the link is dimensioned for the elastic-data traffic flowing over the link based on either a mean performance objective or a tail performance objective using the determined number of connections N, the determined transfer rate for each connection u and the determined per-connection bandwidth objective b. The mean performance objective can be based on the average rate available to a flow of packets for a given connection across a particular link, while the tail performance objective relates to the probability the rate available to a flow of packets is greater than a given value.

When the mean-based performance criterion is used, the step of dimensioning the link bandwidth is defined by $$B = h \cdot N$$

wherein $$h = \left(\frac{1}{b} + \frac{1}{u}\right)^{-1}, \text{ and}$$

wherein u is the transfer rate for a connection given that the communications network is not a constraining resource for the connection.

When the tail-based performance criterion is used the step of dimensioning the link bandwidth is defined by $$B = h \cdot \left[N + \gamma + \sqrt{2\gamma N + \gamma^2}\right]$$

wherein $$h = \left(\frac{1}{b} + \frac{1}{u}\right)^{1}$$

wherein $$\gamma = \frac{1}{2} q_\alpha^2 \cdot b/(b+u),$$

such that, $$\sqrt{N} \, u/b > q_\alpha.$$

wherein $q_\alpha$ is a $(1-\alpha)$-quantile of the standard normal distribution with mean=0 and variance=1, and $\alpha$ is a parameter between 0 and 1.

Once the network has been dimensioned and is in service, then for either the mean-based performance criterion or the tail-based performance criterion, the method of the present invention can include the steps of determining a maximum number of connections N* allowed on the link based on the link bandwidth B, and controlling connection admission to the link based on the determined maximum number of connections N*. Herein, the term "connection admission control" is the policy used to decide whether a connection can be added to a link and still satisfy the performance objective, and regardless of the method used to established the connection, such as signaling protocols or management procedures. When the mean-based performance criterion is used, the step of determining the maximum number of connections N* is defined by $$N^* = B/h.$$

When the tail-based performance criterion is used, the step of determining the maximum number of connections N* is defined by $$N^* = \text{integer}\left(B/h - q_\alpha \sqrt{B/u}\right),$$

where the input parameters are such that $$\sqrt{Bu}\,/b > q_\alpha.$$

Note that the above rules for determining N* are not dependent on the method used to determine the bandwidth B.

The present invention can be used in a communications network that is an ATM network that uses an Available Bit Rate transfer capability or an Unspecified Bit Rate transfer capability. Further, the present invention can be used in a communications network that uses TCP, TCP/IP and/or TCP/IP/ATM for sending the elastic-data traffic over the link.

BRIEF DESCRIPTION OF THE DRAWING

The present invention is illustrated by way of example and not limitation in the accompanying figures in which like reference numerals indicate similar elements and in which:

FIG. 6 shows a flow chart for the implementation of the invention for connection admission control, and FIG. 7 shows a closed-queue-network model that yields additional implementations for dimensioning and CAC.

DETAILED DESCRIPTION

The present invention provides a technique for dimensioning bandwidth for elastic-data traffic over a bottleneck link in a packet-switched communications network, such as an Internet Protocol (IP) network environment or an Asynchronous Transfer Mode (ATM) network environment.

According to the present invention, link bandwidth is dimensioned for elastic-data traffic by satisfying a performance objective that is based on either a mean of a per-flow (per-connection) bandwidth or a tail-probability of a per-flow (per-connection) bandwidth. In other words, the performance objective can be based on the average rate available to a flow of packets for a given connection across a particular link, or the rate available to a flow of packets for a given connection across a particular link is greater than a given value with a given probability.

Figure 2:
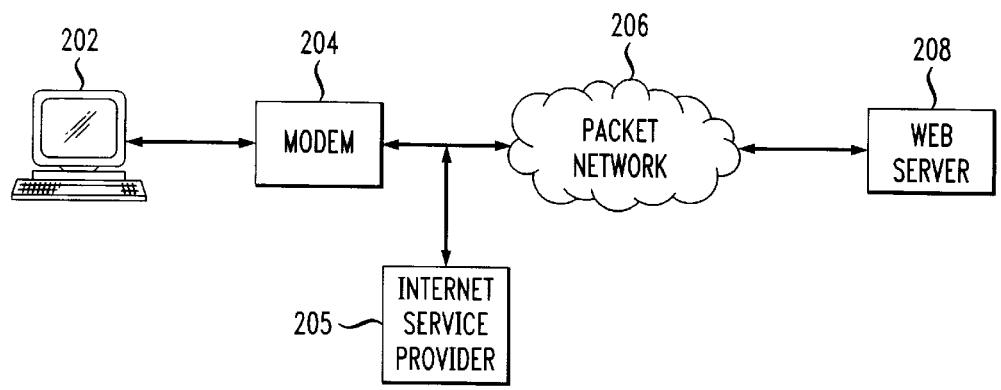
FIG. 2 shows a block diagram of an exemplary system which utilizes the present invention.

An example of the impact of the present invention is illustrated in FIG. 2. Consider a person at a personal computer 202 accessing, via a modem 204 and via a packet network 206, such as the Internet, a remote web server 208 and downloading information of interest from one or more web sites. It is to be understood by one skilled in the art that the modem 204 may be an adjunct to personal computer 202 or may be integrated into personal computer 202. Furthermore, connection to the web server may occur via connection to an access server 205, such as an Internet Service Provider (ISP) which provides the connection to packet network 206.

The packet network 206 may comprise a single packet network or a multiplicity of packet networks, such as, e.g., the "backbone" networks comprising the Internet. The information to be downloaded is stored as files at the web server 208. Files or other resources on computers around the world may be publicly available to the user of personal computer 202 through the collection of networks known as the Internet. The collection of all such publicly available resources, linked together using files written in Hypertext Mark-up Language ("HTML") is known as the World Wide Web ("web"). The transfer of the files to the personal computer 202 occurs as a flow of Internet Protocol (IP) packets from the web server 208 to the personal computer 202, via, for the present example, a network provider, or operator, that has implemented the present invention.

In accordance with the present invention, the network provider has sized the links in its network 206 so that a flow of packets for a given connection receives bandwidth of at least a given amount. In addition to an internal design objective, the network provider might also publically advertise the design objective of providing bandwidth of a given amount for each customer's flow of packets.

Suppose that the web server 208 is transferring a 100 k-byte file (i.e., 800,000 bits) to personal computer 202. If the present invention is not used by the network provider and the network 206 is congested, a transfer rate of only 1 kilobit per second (kbps) might be realized, causing the file transfer to take 800 seconds—roughly 13 minutes. However, as the network provider designs the network 206 to provide a given bandwidth per flow, say the bandwidth objective was 28 kbps (corresponding to a common modem speed of home computers), then the file transfer is completed in less than half a minute.

Figure 1:
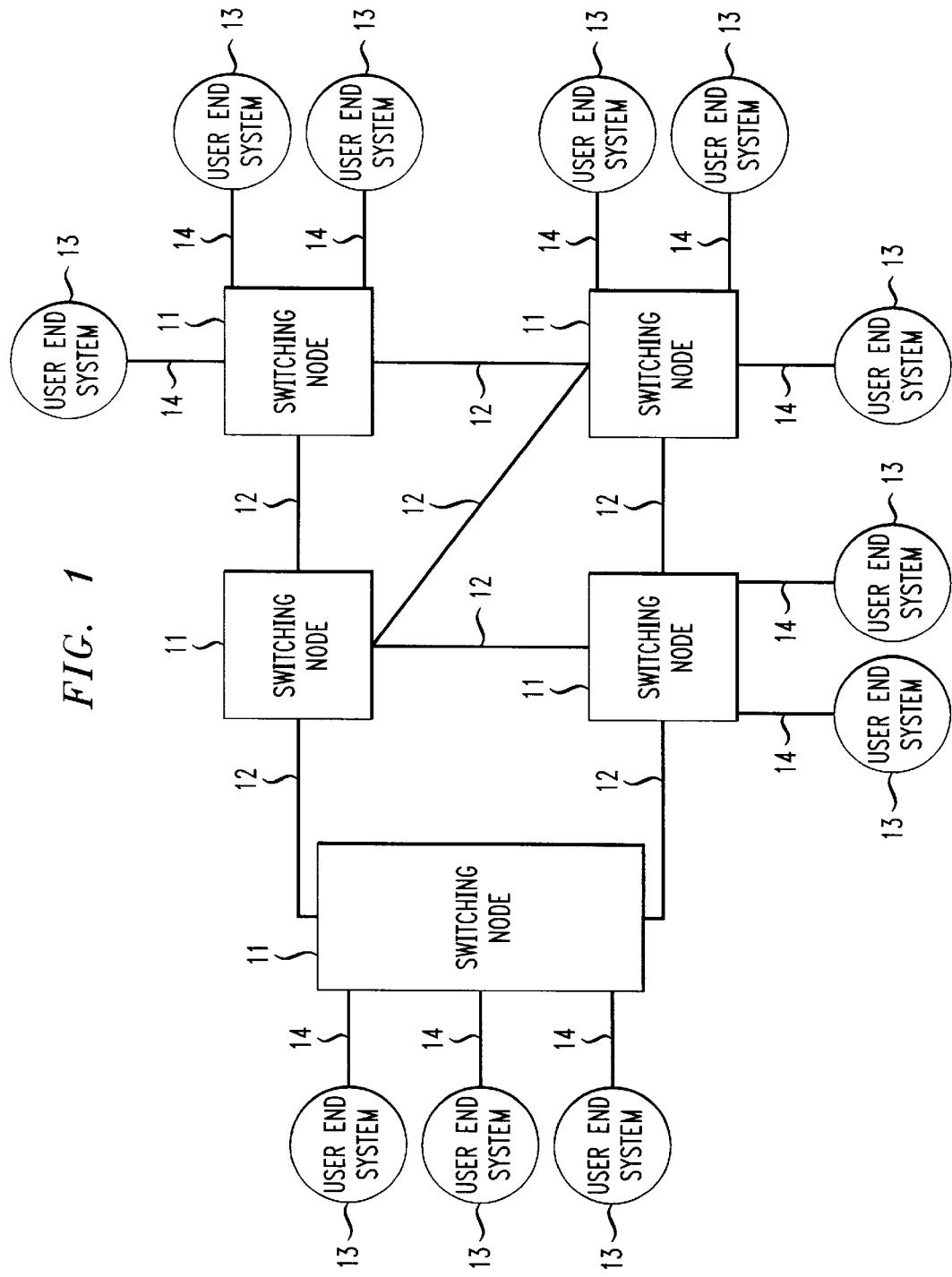
FIG. 1 shows a schematic block diagram of an exemplary communications network that supports elastic-data traffic.

The term "link", as used herein, is the object that is to be dimensioned for elastic-data traffic in terms of bandwidth. A link may be the entire bandwidth of a (single-hop) transmission path, or may be a portion of the bandwidth of the transmission path, such as a virtual path connection in an ATM environment. The term link also refers to a single direction of communication. Thus, referring to FIG. 1, link 12 actually represents two communication paths, one for each direction of communication. In general, the capacity of the path in one direction can be different from the capacity in the other direction. In practice, however, the two capacities are often restricted to be the same, in which case the link capacity is the maximum of the capacities needed for each direction. The term "connection", as used herein, applies to either an ATM connection, or more generally a virtual circuit in a connection-orientated packet network or, with some blurring of meaning, to an IP flow of packets. In the context of an IP flow of packets, the flow is defined at the discretion of a network designer and can include the source and destination IP address, or sub-net thereof, and possibly additional descriptors, such as the protocol field in an IP header or port number in a TCP header. More informally, a connection can be thought of as representing a user.

The link bandwidth dimensioning technique of the present invention is only one aspect of an overall design of a network environment. An overall candidate network topology is analyzed based on a forecasted point-to-point traffic demand that is to be routed across the network. The traffic demand is defined in terms of the number of simultaneous flows or connections that are to be supported in a given load-set period, so the number of concurrent flows/connections that are to be supported on each link of the network can be determined. The technique of the present invention focuses on a single link in a network and assumes that all of the flows/connections traversing the link are bottlenecked at the link. This is equivalent to a conservative procedure of sizing each respective link of a network for the possibility that the link can be a bottleneck for all of the flows/connections traversing the link. With this in mind, the present invention can be extended to dimensioning bandwidth over multiple links, and thus to the overall design of a network.

The link bandwidth dimensioning technique provided by the present invention is applicable to both IP and ATM networks providing a best-effort service. In the context of ATM, a best effort service corresponds to an Unspecified Bit Rate (UBR) or an Available Bit Rate (ABR) transfer capability where the minimum frame rate or cell rate is at a default value of zero. Either network type may be supporting other services that the nodes of the network serve at higher priorities. Under such conditions, the present invention is applicable to the portion of a link bandwidth that is dimensioned for elastic-data traffic, which is typically all of the remaining available bandwidth of the link.

Figure 3:
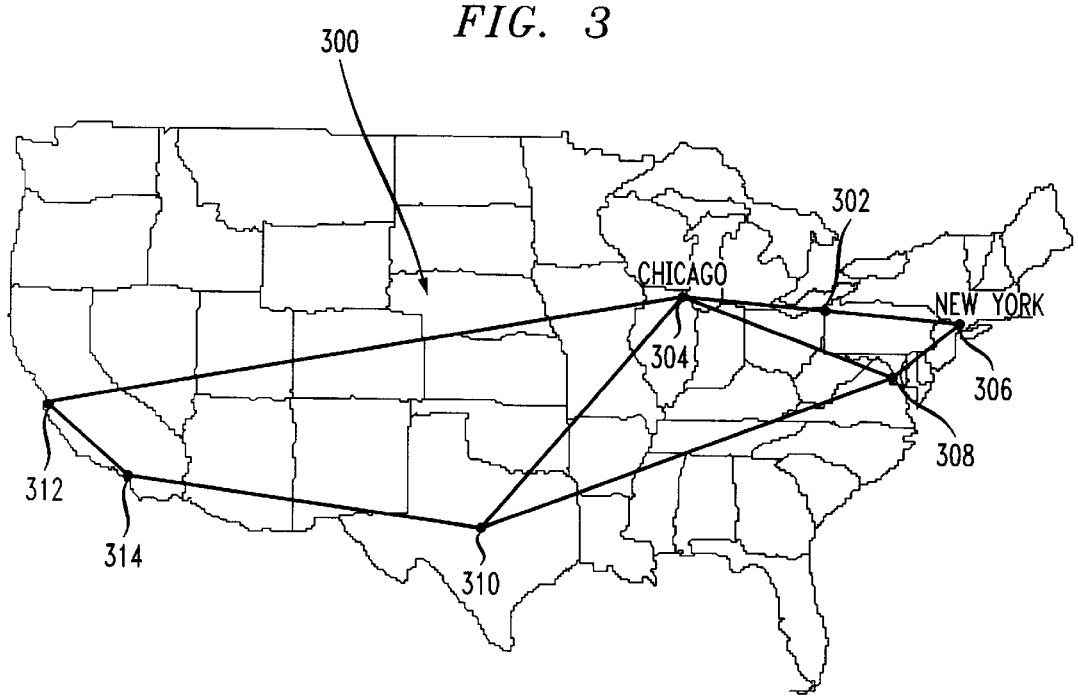
FIG. 3 shows a schematic diagram of a network and focuses on a link thereof which is dimensioned according to the present invention.

The present invention is described in conjunction with FIG. 3 which illustrates an initial design of a data network 300 for which a given link 302, is to be dimensioned for bandwidth for the transport of elastic-data traffic. In the present example, the link 302 to be dimensioned is carrying traffic between a network node 304 located in Chicago and a network node 306 located in New York City. As can be seen in FIG. 3, other nodes 308, 310, 312, 314 form part of the data network 300 which may be used to carry data to strategically identified cities in the United States. Each of the links connecting these nodes to one another must also be dimensioned in order to permit for projected traffic flow between the nodes.

In the following description of the present invention, the closed-loop control for elastic-data traffic associated with link 302 is assumed to use well-known techniques that are well-performing. A key attribute of a well-performing closed-loop control is that it maintains some bytes in a queue at a bottleneck link, for example link 302, with a minimal consequent packet or cell loss. In contrast, a poorly performing closed-loop control oscillates between an under-controlling state (leading to excessive packet or cell loss) and an over-controlling state (where, for example, TCP needlessly enters a slow-start or time-out state). Thus, a poorly performing closed-loop control limits throughput of a user to below what is possible with the available bandwidth. The assumption of a well-performing closed-loop control for the present invention is consistent with ongoing research efforts to improve current controls and leads to significant simplification in the network 300 used to illustrate the present invention.

The present invention also assumes that the network 300 is heavily loaded because, for dimensioning, the relevant case is when network resources, as opposed to end-system resources, are the limiting factor for the throughput obtained for elastic-data connections. A network design that assumes well-performing closed-loop controls is complementary to control implementations that make good use of the deployed bandwidth. The closed-loop feedback controls of both TCP and ABR tend to seek out and fill up available bandwidth. At heavily loaded links, closed-loop feedback control of a connection attempts to keep at least one packet queued for transmission on the link when the control is properly designed and functioning. Otherwise, the control is needlessly limiting the throughput.

According to the present invention, the link bandwidth is sized, or dimensioned, based on a forecast of the number of connections that could be present simultaneously on the link during a busy period. This number of connections is referred to as N. For example, in FIG. 3, the link 302 between Chicago and New York should have the capacity to support N=1,000 connections simultaneously. Each connection alternates between an active phase and an idle phase. During the active phase, packets are transmitted from a source to a destination. When the active phase ends, the idle phase begins and no packets are in transit from the source to the destination. Similarly, when the idle phase ends, the source begins to transmit at least one packet. Typically, multiple packets are in transit at any given time during the activity phase. A simple case is when at most one packet is in transit. A practical example is when the packets of an active phase form the transmission of a file between two higher-layer applications across a wide-area high-speed network. For example, in FIG. 2, the computer 202 could be located in the New York City area, and via its modem 204 and internet service provider 205, it could be receiving a file from web server 208, where the latter happens to be located in the Chicago area. The stream of packets corresponding to this file transfer passes through a backbone packet network 206, and, for example, in particular passes through a network node in Chicago, 304 in FIG. 3, the link 302, and the network node 306 in New York.

As the link 302 will be heavily utilized, a candidate dimensioning rule could assume that each of the N connections would get 1/N of the link capacity. However, this assumption would lead to an over-engineering of the link capacity, since the likely number of concurrently active connections, n, is less than N. We find n and for the dimensioning rule assume that a connection, when active, can obtain 1/n of the link capacity. In the calculation of n we need a model. We approximate the distribution of n/N by the normal distribution and use this result to obtain the dimensioning rules.

For the present invention, the characterization of a connection only depends on the average rate, in bits per second [bps] of an arbitrary connection given that link 302 is not the constraining resource for the connection. This rate is denoted u.

For elastic-data applications, the performance measure of most interest is the delay (latency) for the transfer of a file, as opposed to the delay of an arbitrary packet. Since the range of file sizes is huge, from 10's of bytes to Mega or Giga bytes, a single delay objective, say 1 second, for all files is not practical. Rather the delay objective should be normalized by the file size. This is equivalent to a rate in bits-per-second. Thus, the present invention satisfies a performance criterion based on the bandwidth that an arbitrary connection obtains in the steady state, denoted as $B_c$, and defined as:

$$B_c = \frac{B}{\hat{Q}_1}$$

where B is the link bandwidth to be dimensioned, and $\hat{Q}_1$ is the conditional number connections in the active phase on the given link, given that a least one of the connections is in the active phase.

The performance criteria, based on the mean and on the tail probability of $B_c$, are respectively:

$$E[B_c] \geq b \quad (1)$$

and $$Pr(B_c < b) < \alpha \quad (2)$$

for a given b and α, where b is the per-connection bandwidth objective. Preferably values of b are in the range of $10^3$ to $10^7$ bits/second, but it is to be understood by those skilled in the art that other values could be used. Preferably, the values of α are in the range of 0.01 to 0.1, though other values are also relevant.

The dimensioning problem is simply stated as: Minimize B such that the selected performance criterion of Eq. (1) or Eq. (2) is satisfied.

An accurate solution to the dimensioning problem is:

$$B = h \cdot N \quad (3)$$

given the mean performance criterion of Eq. (1), where $$h = \left(\frac{1}{b} + \frac{1}{u}\right)^{-1}. \quad (4)$$

Likewise, $$B = h \cdot \left[N + \gamma + \sqrt{2\gamma N + \gamma^2}\right] \quad (5)$$

given the tail performance criterion of Eq. (2), where $$h = \left(\frac{1}{b} + \frac{1}{u}\right)^{-1} \quad (6)$$

and $$\gamma = \frac{1}{2}q_\alpha^2 h/u = \frac{1}{2}q_\alpha^2 \cdot b/(b+u),$$

and where the input parameters are such that $$\sqrt{N} u/b > q_\alpha,$$

and wherein $q_\alpha$ is a (1−α)-quantile of the standard normal distribution with mean=0 and variance=1, and α is a parameter between 0 and 1.

According to the present invention, Eqs. (3) and (5) are the dimensioning rules used for solving the dimensioning problem, and provide explicit simple closed-form expressions for the dimensioned bandwidth.

Figure 4:
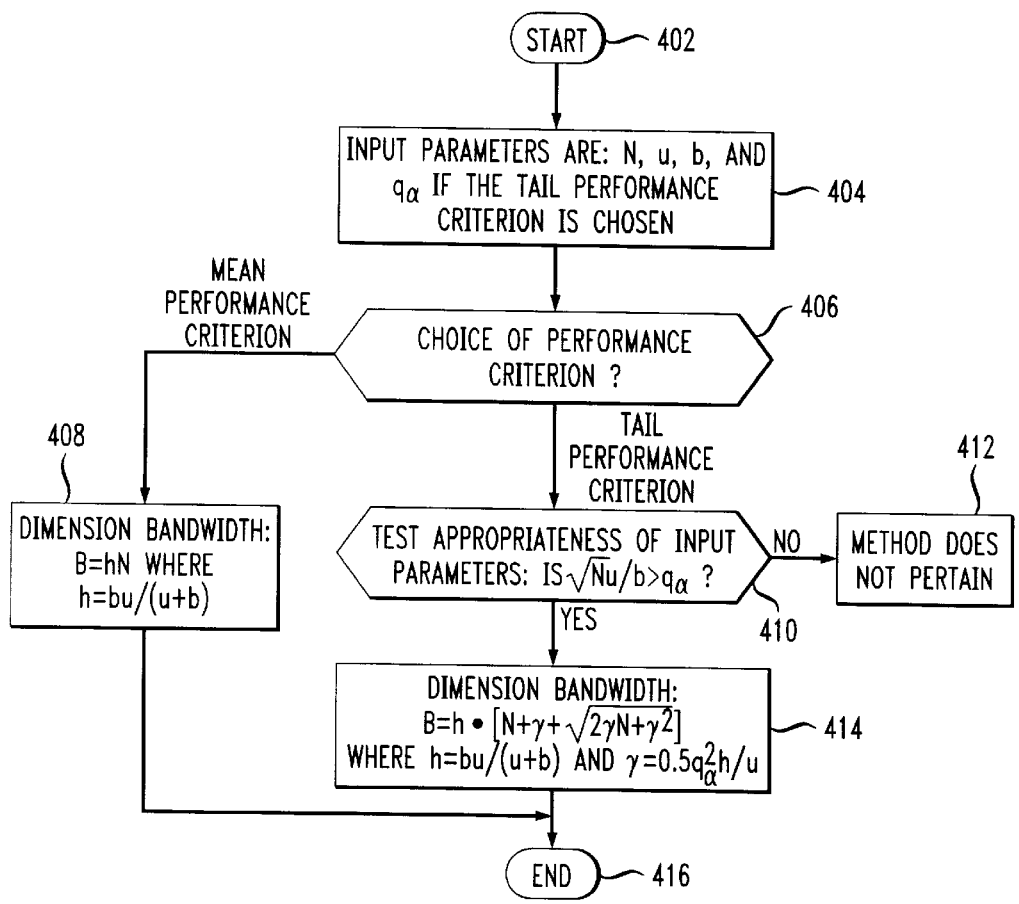
FIG. 4 shows a flow chart for the implementation of the invention for dimensioning bandwidth.

FIG. 4 shows a flow chart for the implementation of the invention for dimensioning bandwidth that uses the above equations. To dimension the bandwidth of a link, for example the link 302 between Chicago and New York in FIG. 3, the input parameters 404 are the number of connections, N, the per-connection transfer rate if the link 302 were not a constraining resource, u, the per-connection bandwidth objective, b, and if the tail performance criterion is chosen, the (1−α) quantile, $q_\alpha$, of normal random variable with mean zero and variance one. If the mean performance criterion is used, 406, then the bandwidth is dimensioned according to equation 3, 408. Otherwise, if the tail performance criterion is used, 406, then first a check is made to determine whether the values of the input parameters are appropriate for the method, 410. Expected realistic values of the input parameters satisfy this check, though one can conceive of values that do not, in which case the method does not pertain, 412. Given that the input parameters are appropriate, the bandwidth is dimensioned according to equation (5), 414.

To illustrate the above method, suppose N equals 1,000 connections, u equals 30 Kilo-bits per second (Kbps), and b also equals 30 Kbps. Suppose also that the tail performance criterion is used, and that α equals 0.01 (i.e., the probability that a connection obtains bandwidth less than the objective b is less than 1%.) From statistic tables or other means, $q_\alpha$ is found to equal 2.326. In the test for appropriateness of input parameters, since √Nu/b equals 31.6 and thus is indeed greater that $q_\alpha$, the test is passed. In the next step, h is computed to be 15 Kbps, and γ equals 1.353, and thus the dimensioned bandwidth, B, equals 15.8 Mega-bps.

After the network 300 has been dimensioned and placed into service, a network operator may exercise no connection/flow admission control (CAC), as is the case in the present best-effort-service IP-based networks. In such a situation, the performance objectives of Eqs. (1) and (2) should be viewed as design objectives, and the network operator could advertise that the network 300 has been designed based on such objectives. The realized traffic will, however, differ from the forecast, so it would be imprudent for the network operator to offer a per-connection service commitment to individual users. If such a service commitment is desired, the network operator would likely exercise a CAC policy on the realized traffic.

Figure 5:
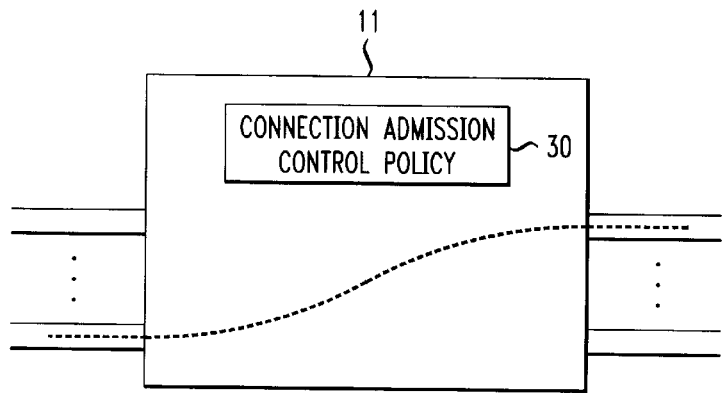
FIG. 5 shows a schematic block diagram of a network node 11 having a connection admission control (CAC) policy according to the present invention.

FIG. 5 shows a schematic block diagram of a network node 11 having a CAC policy according to the present invention. Elastic-data traffic is received by network node 11 on, for example, an ingress link 12A. Access admission of the elastic-data traffic, represented by a dashed line, to egress link 12B is controlled by network node 11 using a CAC policy 30 that is based on the criterion of Eq. (1) or Eq. (2).

To exercise a CAC policy in IP-based networks, the network nodes would need to be able to identify a flow. For example, IP packets with common source addresses and destination addresses could be classified as a given flow.

Equations (3) and (5) can be used for a connection admission control (CAC) policy. For the CAC policy, the maximum number of connections allowed on the link N* needs to be determined for a given link bandwidth B. Access to the link is then controlled based on the determined maximum number N*. Equation (3) gives the value N* directly for the mean performance criterion, that is, $$N^* = B/h, \qquad (7)$$

where h is given in Eq. (4).

For the tail performance criterion of Eq. (2), $$N^* = \text{integer}(B/h - q_\alpha \sqrt{B/u}), \qquad (8)$$

where the input parameters are such that $$\sqrt{Bu}/b > q_\alpha:$$

FIG. 6 shows a flow chart for the implementation of the invention for connection admission control that uses Eqs. (7) and (8). Suppose, for example, that the link 302 between Chicago and New York in FIG. 3, has been dimensioned by some method, and the maximum number of connections to be admitted on link 302, N*, is now determined. The input parameters 604 are the bandwidth of link 302, B, the per-connection transfer rate if link 302 were not a constraining resource, u, the per-connection bandwidth objective, b, and if the tail performance criterion is chosen, the (1−α) quantile, $q_\alpha$, of normal random variable with mean zero and variance one. If the mean performance criterion is used, 606, then N* is determined according to Eq. (7), 608. Otherwise, if the tail performance criterion is used, 606, then first a test is made to determine whether the values of the input parameters are appropriate for the method, 610. Expected realistic values of the input parameters satisfy this check, though one can conceive of values that do not, in which case the method does not pertain, 612. Given that the input parameters are appropriate, N* is determined according to equation (8), 614.

To illustrate the above method, suppose B equals 45 Mega-bps, u equals 30 Kilo-bps, and b also equals 30 Kilo-bps. As before, suppose also that the tail performance criterion is used, and that a equals 0.01. From statistic tables or other means, $q_\alpha$ is found to equal 2.326. In the test for appropriateness of input parameters, since √Nu/b equals 38.7 and thus is indeed greater that $q_\alpha$, the test is passed. In the next step, h is computed to be 15 Kilo-bps, and thus the maximum number of connections that should be admitted on the link 302, N*, equals 2,909.

The above methods for dimensioning a link and for CAC, in particular Eqs. (3), (5), (7), and (8), were derived via normal approximations for a closed-queueing-network (CQN) model in heavy traffic. Aspects of this CQN model are now described as they yield a method for determining the parameter u used above, and additional methods for dimensioning and CAC. Note, however, that the previously described methods can be used without reference to or knowledge of the CQN model.

The fixed number of connections and their alternation between active and idle phases, described above, makes plausible the use of a closed queueing network (CQN) model with two types of servers. FIG. 7 provides a diagram of the CQN model. The first type of server, referred to as a source and labeled 702, is an infinite server (IS), (equivalently the number of servers equals to the number of connections) that models connections while they are in the idle phase. The second type of server, labeled 704, is a processor-sharing (PS) server that models the queueing and emission of packets on the link.

The one non-standard aspect of the CQN model is the entity represented by a "job". For network dimensioning, we are interested in scenarios where the data network is heavily loaded. During such times, network resources (as opposed to end-system resources) will tend to be the limiting factor on the throughput obtained for the elastic-data connections. Moreover, the feedback controls of TCP and ABR will tend to seek out and fill up the available bandwidth. At heavily loaded links, a connection's feedback control, when properly designed and functioning, will attempt to keep at least one packet queued for transmission on the link (otherwise the control is needlessly limiting the throughput). We assume that this is the case. Thus, at an arbitrary point in time, the number of connections that are in the active phase equals the number of connections that have a packet in queue at the bottleneck node, which equals the number of connections that have a packet in queue under the hypothetical scenario that the stream of packets of an active phase arrived as a batch to the network node. A "job" in the CQN model represents this hypothetical batch arrival. Thus, a job represents all of the packets of an active phase of a connection. Note that a job in the CQN does not capture the location of all of the packets of a file transfer, since at a given moment some of these packets may have reached the destination, while other packets are in transit, and others are still at the source. Clearly, with this notion of job, the CQN can not model packet queue lengths or packet losses. However, it does model the number of connections that are in the process of transferring a file, given the assumption of well-performing controls. And this latter entity is just what we need to model the per-connection performance objective.

Thus, the beginning of an active phase (or equivalently the hypothetical batch arrival to the network node) corresponds to a job arriving to the processor sharing (PS) node in the CQN model. A job departing from the PS node and returning to the IS server corresponds to the event when a connection completes its active period and becomes idle. From the number of active connections at the network node (the number of jobs at the PS node in the CQN) one can derive the performance measure of the bandwidth received per connection.

A connection (a source) is characterized by two parameters: (1) the mean time in seconds between completion of transmission of a file and the start of the transmission of the next file, denoted $\lambda^{-1}$, and (2) the mean size of a file in bits, denoted f. $\lambda^{-1}$ is the mean service time in the IS node (the mean think time). Moreover, for the dimensioning and CAC methods, only the product $\lambda f$ is pertinent. This product is the parameter u above and is the throughput of the source given that the network is imposing no restriction on this flow. Given the mean file size and the capacity of the link, B, then the mean service time of a job in the PS node, assuming no other jobs present, is f/B and is denoted $\mu^{-1}$.

For the CQN model, the output port of a network node is assumed to use a well-known fair-queueing technique for the class of elastic-data flows/connections traversing the output port. Suitable exemplary fair-queuing algorithms are disclosed by A. Varma et al., Hardware implementation of fair queuing algorithms for ATM networks, IEEE Communications Magazine, Vol. 35, December 1997, pp. 54–68, which is incorporated by reference herein. The assumption of a fair-queuing technique reflects the trend in the telecommunications industry to implement fair-queuing service disciplines for providing some degree of fairness to users. Specifically for the present invention, network node 404 is assumed to preferably use a processor-sharing technique as a fair-queuing technique.

Let $Q_1$ denote the number jobs at the PS node at an arbitrary time. Thus $Q_1$ represents the number of currently active connections on a network link, for example 302. The performance criteria, Eq. (1) and (2) are satisfied, respectively, if the following conditions in terms of $Q_1$ apply:

$$\frac{E[Q_1]}{Pr(Q_1 > 0)} \le B/b \quad (9)$$

and $$\frac{Pr(Q_1 > B/b)}{Pr(Q_1 > 0)} < \alpha \quad (10)$$

From the CQN model, given B and N and other parameters, one can determine the distribution of $Q_1$ and thus from Eqs. (9) and (10) determine whether the performance objectives are satisfied. This can be used in an iteration to find the smallest B (or largest N) such that performance criteria are satisfied, and thus provides an additional method for dimensioning the link and for CAC.

In particular, from prior art, for example D. Bertsekas et al., Data Networks 2nd Edition, Prentice Hall, Englewood Cliffs, N.J., 1992, the steady state probability mass function for $Q_1$ is:

$$Pr(Q_1 = n) = \frac{1}{G(N)} \cdot \frac{(\lambda/\mu)^n}{(N-n)!} = \frac{1}{H(N)} \frac{(\mu/\lambda)^{N-n}}{(N-n)!}, \quad (11)$$

where $$G(N) = \sum_{k=0}^{N} \frac{(\lambda/\mu)^k}{(N-1k)!},$$

and $$H(N) = \sum_{k=0}^{N} \frac{(\mu/\lambda)^k}{k!}.$$

Eq. (11) can be used in a numerical iteration for exactly computing a link bandwidth B so that the performance criterion given by either Eq. (1) or Eq. (2) is satisfied. This method is more accurate than the method of Eqs. (3) and (5), but it does not yield simple, closed-form dimensioning rules.

Also, asymptotic approximations can be used to derive rules for dimensioning link bandwidth. These asymptotic approximations pertain for the heavy traffic region, which in the CQN model, is defined to be $$\rho > 1, \quad (12)$$

where $\rho$ is $N\lambda/\mu$, which also equals $N\lambda f/B$ and Nu/B. Asymptotic approximations were used to derive the Eqs. (3), (5), (7), and (8). These equations have the self-consistency that if the link were dimensioned according to Eq. (3) or (5), then $\rho$ will indeed be greater than one. Likewise, if the maximum number of admissible connections is determined by Eq. (7) or (8), then again Eq. (12) pertains. Eqs. (3), (5), (7), and (8) have the desirable characteristic that they are simple, closed-form expressions that are easily implemented in network planning tools and in network equipment. If a more accurate result is desired, at the expense of additional complexity, then using a more precise asymptotic approximation, the tail performance criterion, Eq. (2), is satisfied if $$2N\{\rho^{-1}-(1-x)+(1-x)\ln[\rho(1-x)]\} \ge q_\alpha^2. \quad (13)$$

where x equals B/Nb. Thus, $\rho$ can be numerically computed when Eq. (13) holds as an equality, where $\rho \in (1, (1-x)^{-1})$. Given the resulting $\rho$, the required bandwidth of the link, B, or the maximum number of connections, N*, given the bandwidth, is then known since $\rho$ equals Nu/B.

From measurements on existing networks and using the CQN model, one can estimate the value of $\lambda f$, which equals an estimate of u. In particular, for ρ>1, the asymptotic approximation for the mean number of active connections is:

$$E[Q_1] = N(1-\rho^{-1}) = N - B/\lambda f \quad (14)$$

From measurements at a network node, say the network node at Chicago in FIG. 3, and the packet flows exiting the node on a given link, say the link between Chicago and New York, 302, one can estimate the average number of active connections, $E[Q_1]$, as well as the number of potential connections sharing the link, N. Then from Eq. (14), one can determine λf and thus u.

While the present invention has been described in connection with the illustrated embodiments, it will be appreciated and understood that modifications may be made without departing from the true spirit and scope of the invention.

What is claimed is:

1. A method for dimensioning link bandwidth for elastic-data traffic for a link in a communications network, the method comprising the steps of:
   determining a number of connections N having elastic-data traffic flowing over a link in a communications network;
   determining a transfer rate u for each connection for the communications network not being a constraining resource for the connection;
   determining a per-connection bandwidth objective b for elastic-data traffic flowing over the link; and
   dimensioning a link bandwidth B for the link for the elastic-data traffic flowing over the link based on the determined number of connections N, the determined transfer rate u for each connection and the determined per-connection bandwidth objective b.

2. The method according to claim 1 wherein said link, once dimensioned, is heavily utilized.

3. The method according to claim 1, further comprising the step of determining a closed-queuing network model for the link, and
   wherein the step of dimensioning the link bandwidth B for the link is based on the closed-queuing network model for the link.

4. The method according to claim 1, wherein the step of dimensioning the link bandwidth B is based on a mean performance criterion.

5. The method according to claim 1, wherein the step of dimensioning the bandwidth is defined by $$B = h \cdot N$$

wherein $$h = \left(\frac{1}{b} + \frac{1}{u}\right)^{-1}.$$

6. The method according to claim 5, wherein b is between $10^3$ bits per second and $10^7$ bits per second, inclusive.

7. The method according to claim 5, further comprising the steps of:
   determining a maximum number of connections N* allowed on the link based on the link bandwidth B; and
   controlling connection admission to the link based on the determined maximum number of connections N*.

8. The method according to claim 1, further comprising the steps of:
   determining a maximum number of connections N* allowed on the link based on the link bandwidth B; and
   controlling connection admission to the link based on the determined maximum number of connections N*.

9. The method according to claim 8, wherein the step of determining the maximum number of connections N* is defined by:

$$N^* = B/h,$$

where $$h = \left(\frac{1}{b} + \frac{1}{u}\right)^{-1}.$$

10. The method according to claim 1, wherein the step of dimensioning the link bandwidth B is based on a tail performance criterion.

11. The method according to claim 10, wherein the step of dimensioning the link bandwidth is defined by $$B = h \cdot \left[N + \gamma + \sqrt{2\gamma N + \gamma^2}\right],$$

wherein $$h = \left(\frac{1}{b} + \frac{1}{u}\right)^{-1},$$

and wherein $$\gamma = \frac{1}{2} q_\alpha^2 h/u = \frac{1}{2} q_\alpha^2 \cdot b/(b+u),$$

such that, $$\sqrt{N}\, u/b > q_\alpha,$$

wherein $q_\alpha$ is the (1−α)-quantile of the standard normal distribution with mean=0 and variance=1.

12. The method according to claim 11, wherein α is between 0.01 and 0.1.

13. The method according to claim 11, wherein b is between $10^3$ bits per second and $10^7$ bits per second, inclusive.

14. The method according to claim 11, further comprising the steps of:
   determining a maximum number of connections N* allowed on the link based on the link bandwidth B; and
   controlling connection admission to the link based on the determined maximum number of connections N*.

15. The method according to claim 14, wherein the step of determining the maximum number of connections N* is defined by $$N^* = \text{integer}\left(B/h - q_\alpha \sqrt{B/u}\right),$$

wherein $$h = \left(\frac{1}{b} + \frac{1}{u}\right)^{-1},$$

where the input parameters are such that $$\sqrt{Bu}\,/b > q_\alpha,$$

wherein $q_\alpha$ is the (1−α)-quantile of the standard normal distribution with mean=0 and variance=1.

16. The method according to claim 1, wherein the communications network is an ATM network.

17. The method according to claim 16, wherein a connection uses an Available Bit Rate transfer capability.

18. The method according to claim 16, wherein a connection uses an Unspecified Bit Rate transfer capability.

19. The method according to claim 1, wherein the communications network uses a Transmission Control Protocol for sending the elastic-data traffic over the link.

20. The method according to claim 1, wherein the communications network uses a Transmission Control Protocol over an Internet Protocol for sending the elastic-data traffic over the link.

21. The method according to claim 1, wherein the communications network uses a Transmission Control Protocol over an Internet Protocol and the Internet Protocol is over an Asynchronous Transfer Mode protocol for sending the elastic-data traffic over the link.

22. A method for dimensioning link bandwidth for elastic-data traffic for a link in a communications network, the method comprising the steps of:

determining a closed-queuing network model for the communication network, the closed-queuing network model having a predetermined number N of connections, and dimensioning the link bandwidth B for the link based on the closed-queuing network model.

* * * * *